United States Patent [19]
Costa

[11] Patent Number: 4,936,424
[45] Date of Patent: Jun. 26, 1990

[54] HYDRAULIC SHOCK ABSORBER WITH PRESSURE SENSITIVE EXTERNAL VALVING

[76] Inventor: Vince F. Costa, 449 Glenmoor Cir., Milpitas, Calif. 95035

[21] Appl. No.: 349,397

[22] Filed: May 9, 1989

[51] Int. Cl.$^5$ .............................................. F16F 9/44
[52] U.S. Cl. ................... 188/299; 267/64.22
[58] Field of Search ............ 188/285, 299, 314; 267/64.18, 64.22, 64.26, 218; 280/709, 710

[56] References Cited

U.S. PATENT DOCUMENTS 1,957,658 5/1934 Logan ................................. 188/299
4,153,237 5/1979 Supalla ........................... 188/299 X

FOREIGN PATENT DOCUMENTS

896311 11/1953 Fed. Rep. of Germany ...... 188/299

Primary Examiner—Duane A. Reger

[57] ABSTRACT

A shock absorber with provisions for independent external adjustment of both rebound and compression pressure sensitive valving. The shock absorber makes use of a rebound tube located internal to the piston rod to transmit fluid from the rebound chamber to an external line. External lines from both the rebound and compression chambers are connected to an external valving reservoir. The valving reservoir contains separate rebound and compression metering devices. The metering devices are externally adjustable and consist of spring loaded needles.

8 Claims, 5 Drawing Sheets

HYDRAULIC SHOCK ABSORBER WITH PRESSURE SENSITIVE EXTERNAL VALVING

BACKGROUND—FIELD OF INVENTION

This invention relates to shock absorbers, specifically those with external adjustment.

BACKGROUND—DESCRIPTION OF PRIOR ART

Shock absorbers are used in the suspension of motorcycles and other vehicles to dampen the free vibrations and mitigate the shocks due to the vehicle traversing bumps. The task of the suspension is to allow the tires to maintain contact with the road surface.

The shock absorbers typically used in vehicles operate on the dashpot principal. A piston moving in a cylinder filled with oil restricts the response of the suspension springs. Relative motion between the frame and suspension causes the shock absorber piston to displace fluid. The displaced fluid is throttled, either by spring loaded valves or by leakage thru a fixed orifice.

Currently available racing shock absorbers utilize a stack of washers on the piston to obtain pressure sensitive valving. To change these washers it is required that the shock absorber be completely disassembled.

A racing motorcycle will be expected to perform optimally on a wide variety of tracks. Precise shock absorber operation is a critical factor for obtaining fast lap times.

A racing team will have only a small amount of time to make suspension adjustments prior to the race. Thus the ability to make adjustments quickly is critical.

Suspension set up is often considered a black art rather than a science. With many of the currently available externally adjustable shock absorbers a single change will effect both the rebound and compression damping simultaneously. Keeping the effect of adjustments as separate as possible allows changes to be made without confusing the suspension tuner. The rider must also be able to isolate the effect of adjustments, and how they relate to vehicle performance.

The prior art shock absorbers are deficient in the aspect that the there is little or no provision made for adjusting the valving which is responsive to to the differential pressures existing within the shock absorber. With current shock absorbers all or most of the pressure sensitive valving is contained in the piston of the shock absorber. To adjust the pressure sensitive valving it is required to disassemble the shock absorber.

In some cases the shock absorber will provide a flow path in parallel to the pressure sensitive piston valving where an orifice may be adjusted in size. However, the pressure sensitive valving is still only adjustable by disassembling the shock absorber, a tedious task.

Other designs exist, typically the rebound chamber and compression chamber are linked directly to external lines. This practice is not feasible with the use of a coil over shock as lines attached to the rebound chamber tend to become tangled in the coil spring. Alternatively, concentric cylinders around the main body of the shock absorber transmit fluid from the rebound chamber to the top of the shock. Unfortunately the extra cylinder acts as an insulator to the main body of working fluid. The extra cylinder will also increase the diameter of the body excessively so that the shock would not be compatible with the inside diameter of the coil over springs used on todays racing motorcycles without a loss of piston diameter.

Heretofore the currently available externally adjustable shock absorbers which could be used with a coil over type spring were limited in that:

(a) The available range of external adjustment is minimal in comparison to the range of adjustment offered by disassembly of the unit.
(b) Current racing shocks in use today rely on pressure sensitive valving. The pressure sensitive valving is mounted internally and is not adjustable without disassembly of the shock.
(c) The available external adjustments do not always effect the rebound or compression independently.
(d) Lines attached directly to the rebound chamber tend to become tangled in the coil spring.
(e) Concentric cylinders around the main body of the shock absorber transmit fluid from the rebound chamber to the top of the shock. Unfortunately, the extra cylinder acts as an insulator to the main body of working fluid and more importantly increase the diameter of the body excessively so that the shock is not compatible with currently available coil over springs.

OBJECTS AND ADVANTAGES

Accordingly, several objects and advantages of the present invention are:

(a) to provide a compact shock absorber which can be used with coil over type springs and directly replace currently available motorcycle shock absorbers;
(b) to provide externally adjustable pressure sensitive valving, whereby the adjustments for rebound and compression may be performed independently;
(c) to provide the capability to make adjustments quickly and easily;
(f) to provide a wide range of damping adjustments;
(g) to provide circulation of oil flow for improved cooling;
(h) to provide maximum stroke length with minimum total shock length.

Other objects, advantages and features of this invention will become apparent when the following description is taken in conjunction with the accompanying drawings.

DESCRIPTION OF DRAWINGS

In the drawings, closely related components have the same number but different alphabetical suffixes.

REFERENCE NUMERALS IN DRAWINGS

11. Shock assembly
12. Valving reservoir assembly

13. External rebound line
14. External compression line
15. Outer cylinder
16. Piston rod
17. Rebound tube
18. Upper cap
19. Upper cap lug
20. Bottom cap
21. Bottom cap seal
22. Piston rod lug
23. Suspension coil spring
24. Adjustable coil spring fitting
25. Piston rod spring mount
26. Piston
27. Rebound chamber
28. Compression chamber
29. Opening
30. Piston rod internal chamber
31. Rebound tube opening
32. Compression exit passage
33. Reservoir body
34. Valving block
35. Reservoir piston
36. Reservoir end cap
37. Gas valve
38. Reservoir fluid chamber
39. Reservoir gas chamber
41R. Rebound inlet passage
41C. Compression inlet passage
42R. Rebound transfer passage
42C. Compression transfer passage
43R. Rebound needle passage
43C. Compression needle passage
44R. Rebound needle
44C. Compression needle
45R. Rebound check valve
45C. Compression check valve
46R. Rebound needle jet
46C. Compression needle jet
47R. Rebound needle guide
47C. Compression needle guide
48R. Rebound needle exit passage
48C. Compression needle exit passage
49R. Rebound needle seal
49C. Compression needle seal
50R. Rebound needle spring
50C. Compression needle spring
51R. Rebound spring tube
51C. Compression spring tube
52R. Rebound needle seat
52C. Compression needle seat
53R. Rebound spring rate adjuster pin
53C. Compression spring rate adjuster pin
54. Spring tube holes
55. Needle body
56. Needle taper
57. Needle head
59. Rebound exit passage
60. Rebound tube seal
61. Piston and piston rod assembly

Figure 1:
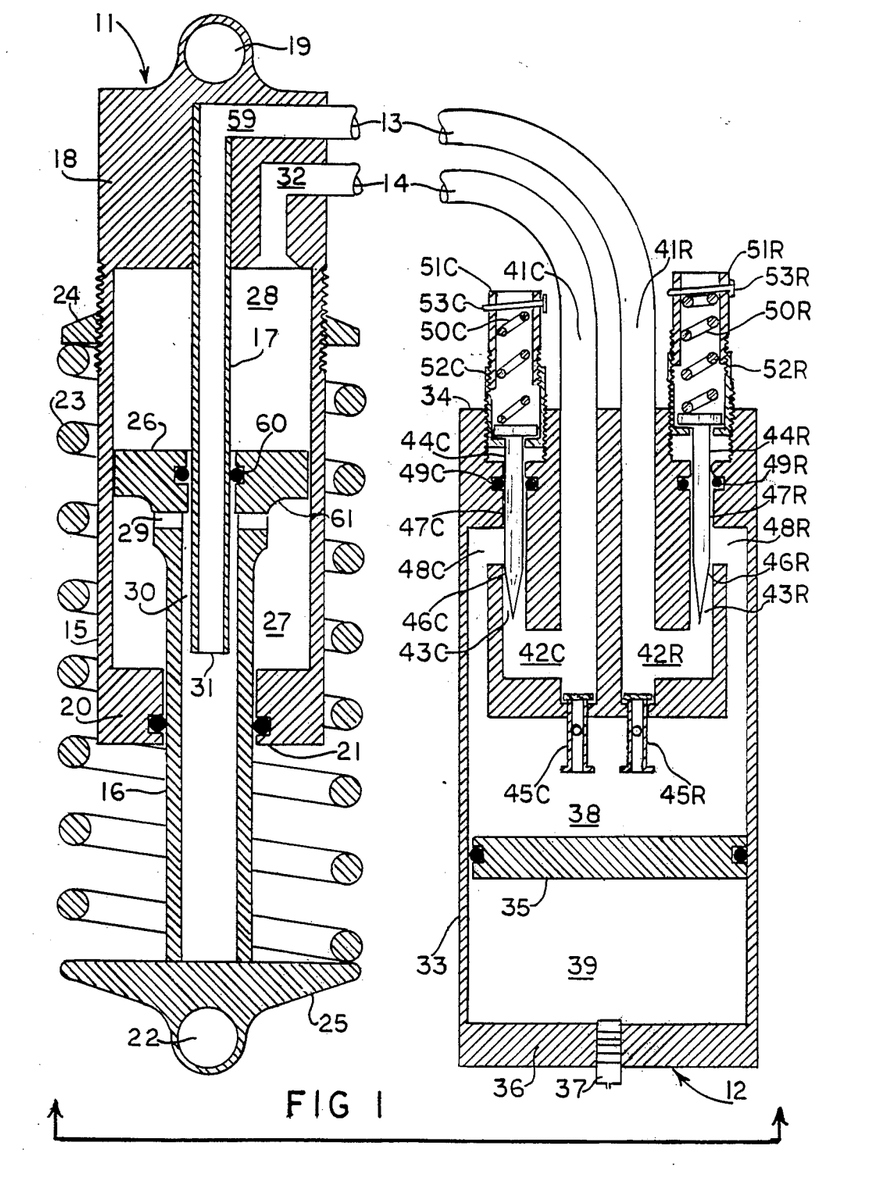
FIG. 1 is a longitudinal sectional view through the shock absorber and valving reservoir which may be used to embody the features of the invention.
Figure 2:
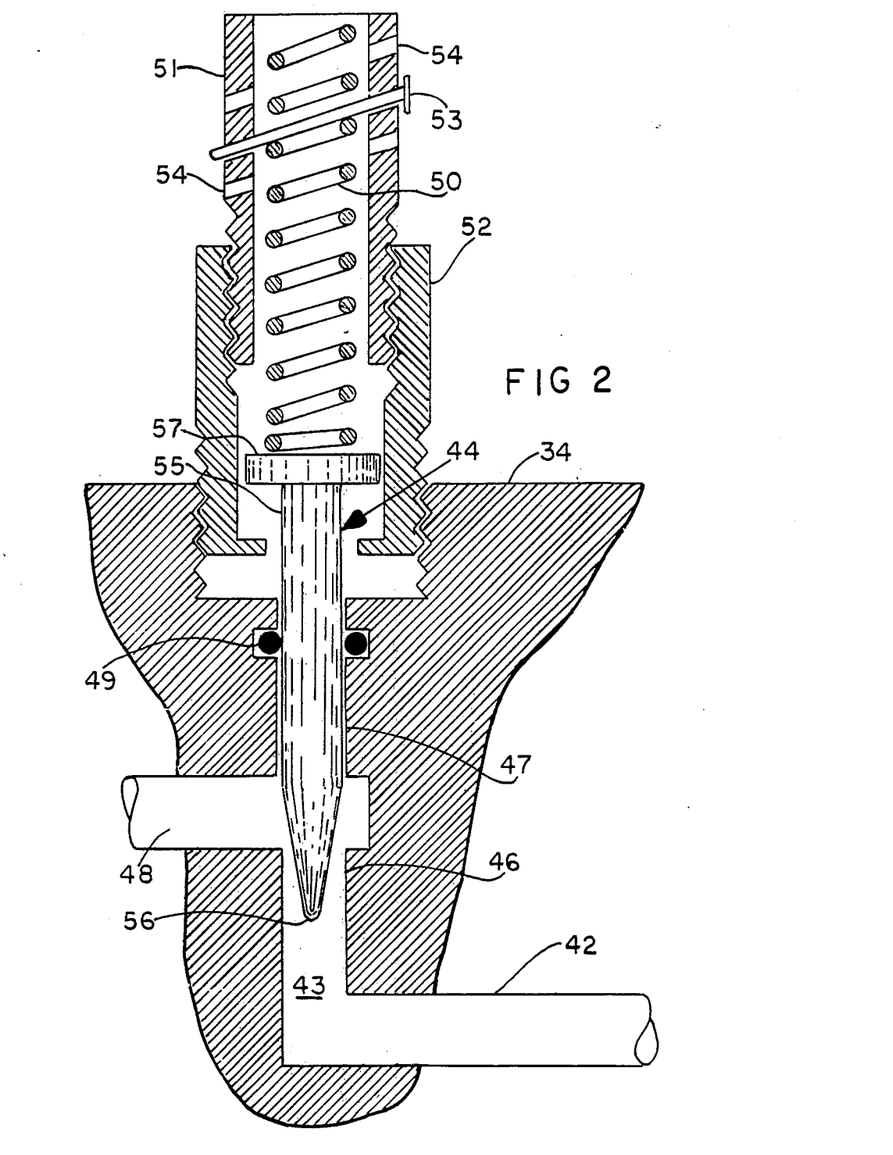
FIG. 2 is an enlarged longitudinal sectional view of the metering device.

DESCRIPTION—FIGS. 1,2

A typical embodiment of the invention is illustrated in FIG. 1. This invention consists of two primary components the shock assembly 11 and the valving reservoir assembly 12. These two components are connected by a pair of flexible lines, the external rebound line 13 and the external compression line 14.

The shock assembly 11 consists of three concentric hollow cylinders, the outer cylinder 15, the piston rod 16 and the rebound tube 17. The outer cylinder is attached at one end in a fluid tight manner to the upper cap 18. The shock assembly is attached to the vehicle frame by the upper cap lug 19 which is part of the the upper cap 18. At the end of the outer cylinder 15 opposite to the upper cap 18, the outer cylinder 15 is attached in a fluid tight manner to the bottom cap 20.

The piston rod 16 is formed from a hollow cylindrical tube of smaller diameter than the inside diameter of the outer cylinder 15. The piston rod 16 is concentric to the outer cylinder 15. The piston rod 16 is fitted thru an opening in the bottom cap 20, and is concentric with the bottom cap 20. The bottom cap 20 provides a bearing surface for the piston rod 16. The piston rod 16 is free to slide within the bottom cap 20. Bushings are provided in the bottom cap 20 so that the piston rod 16 is free to slide within the bottom cap. A bottom cap seal 21 is provided to prevent the escape of fluid where the piston rod 16 passes thru the bottom cap 20.

The end of the piston rod 16 which is external to the outer cylinder 15 is connected to the piston rod lug 22. The piston rod lug 22 provides a mounting point for the vehicle suspension.

This shock absorber is intended to work with a coil over type spring. The coil spring is used to support the weight of the vehicle. The suspension coil spring 23 is held by an adjustable fitting 24 on the outer cylinder 15 at one end and by the piston rod spring mount 25 at the other end.

A piston 26 fits internal to and concentrically within the outer cylinder 15. The piston 26 divides the shock assembly 11 into two main chambers, the rebound chamber 27 and, the compression chamber 28. The piston 26 is attached to the end of the piston rod 16 opposite to the piston rod lug 22. The piston 26 and piston rod 16 move together as a unit and together form the piston and piston rod assembly 61. A suitable sealing surface is provided between the piston 26 and the inside surface of the of the outer cylinder 15 to restrict the flow of fluid around the piston 26, while still allowing the piston to slide freely within the outer cylinder.

The rebound tube 17 is a hollow cylindrical tube internal and concentric to the hollow piston and piston rod assembly 61. The rebound tube 17 is connected at one end to the rebound exit passage 59 located in the upper cap 18. The rebound tube opening 31 is located at the other end of the rebound tube 17. Fluid is unrestricted to pass through the rebound tube 17 to the rebound exit passage 59.

The piston rod internal chamber 30 is created by the rebound tube 17 and the piston rod 16. The inner cylindrical surface of the piston rod 16 and the outer cylindrical surface of the rebound tube 17, being of different diameters and being mutually concentric form a cylindrical space therebetween, which is used to transmit fluid which passes thru the openings 29 in the piston and piston rod assembly 61 to the rebound tube opening 31 in the rebound tube 17. The rebound tube to piston rod clearance is large enough to permit the flow of fluid between the outer diameter of the rebound tube and the inner diameter of the piston rod with negligible restriction. The rebound tube 17 provides means for fluid in the rebound chamber to be transmitted to an external rebound line 13 connected at the upper cap 18.

An opening 29 is provided in the piston and piston rod assembly 61 so that fluid may pass from the rebound chamber 27 to the piston rod internal chamber 30. The opening 29 is sized so that the restriction to the flow of fluid is negligible.

An annular sealing material such as an 0-ring is used to form the rebound tube seal 60. The rebound tube seal 60 is placed in the piston and piston rod assembly 61. The rebound tube seal 60 prevents the flow of fluid between the compression chamber 28 and the piston rod internal chamber 30, while allowing the flow of fluid between the piston rod opening 29 and the rebound tube opening 31. Thus the direct flow of fluid between the rebound chamber and the compression chamber is prevented by the rebound tube seal 60.

Thus the rebound chamber 27 is connected directly to the external rebound line 13 which transmits fluid from the rebound chamber 27 to the valving block 34 by use of the compact rebound tube 17.

The compression chamber 28 is connected directly to the compression exit passage 32 which transmits fluid from the compression chamber to the external compression line 14.

An external valving reservoir assembly 12 is provided which is connected to the shock absorber assembly 11 by the external rebound and compression lines 13 and 14. The external reservoir is comprised of four main subassemblies, the reservoir body 33, the valving block 34, the reservoir piston 35, and the reservoir end cap 36.

The reservoir body 33 consists of a hollow cylindrical tube which is sealed at one end by the reservoir end cap 36 to prevent the escape of fluid.

Concentric with the reservoir body 33 is the reservoir piston 35. The piston divides the reservoir into two chambers, The reservoir fluid chamber 38 which is filled with liquid and the reservoir gas chamber 39, which is filled with pressurized gas.

The reservoir end cap 36 has a gas valve 37. The gas valve 37 allows the introduction of a pressurized gas to the reservoir gas chamber 39.

The valving block 34 is mounted in a fluid tight manner concentrically within the reservoir body 33 at the end of the reservoir body 33 opposite to the reservoir end cap 36. The valving block 34 is a primary feature of the invention.

The external rebound line 13 and the external compression lines 14 attach to the valving block 34. Fluid from the shock assembly flows thru the external lines to the valving block inlet passages 41R and 41C.

The valving block consists of two separate circuits, one for the metering of compression flow and one for the metering of rebound flow. Each circuit is comprised of a fluid throttling or pressure limiting device and, a check valve. The throttling device allows the strength of the damper to be adjusted. The adjustment of rebound and compression damping is independent. The check valve allows fluid to return to the backside of the piston but prevents the escape of fluid thru the metering device.

There are four primary passages in the valving block 34, the rebound inlet passage 41R, the rebound needle passage 43R, the compression inlet passage 41C, and the compression needle passage 43C. The external rebound line 13 attaches to the rebound inlet passage 41R and, the external compression line 14 attaches to the compression inlet passage 41C. There are many ways to arrange the passages. The embodiment favoured has the four primary passages, (the rebound inlet 41R, rebound needle 43R, compression inlet 41C and, compression needle 43C) arranged parallel to the longitudinal axis of the reservoir body 33.

The external rebound line connects to the rebound inlet passage 41R. The rebound inlet passage 41R accommodates the rebound check valve 45R. The rebound check valve 45R prevents the flow of fluid from the rebound inlet passage 41R to the reservoir fluid chamber 38 but permits it the other way. The rebound inlet 41R and the rebound needle passage 43R are connected by the rebound transfer passage 42R. The rebound needle passage 43R is closed at one end and opens to the rebound needle seat 52R at the other end. The rebound needle seat 52R screws into the valving block 34.

The rebound needle passage 43R consists of two sections, the rebound needle jet 46R and, the rebound needle guide 47R.

The rebound needle exit passage 48R splits the rebound needle passage 43R into the rebound needle guide 47R and rebound needle jet 46R passages. The rebound needle exit passage 48R is open to the main reservoir.

The external compression line connects to the compression inlet passage 41C. The compression inlet passage 41C accommodates the compression check valve 45C. The compression check valve 45C prevents the flow of fluid from the compression inlet passage 41C to the reservoir fluid chamber 38 but permits it the other way.

The compression inlet passage 41C and the compression needle passage 43C are connected by the compression transfer passage 42C. The compression needle passage 43C is closed at one end and opens to the compression needle seat 52C at the other end. The compression needle seat 52C screws into the valving block 34.

The compression needle passage 43C consists of two sections, the compression needle jet 46C and, the compression needle guide 47C. The compression needle exit passage 48C intersects the compression needle passage 43C, and splits the passage into the compression needle guide 47C and compression needle jet 46C passages. The compression needle exit passage 48C is open to the reservoir fluid chamber 38.

The needle 44 assembly and needle passages form a pressure relief valve. The needle 44 is the part of the fluid throttling device which restricts the flow of liquid thru the needle jet. There are two needles, one for throttling the compression flow and one for throttling the rebound flow. The rebound needle 44R fits concentrically in the rebound needle passage 43R. The compression needle 44C fits concentrically in the compression needle passage 43C.

FIG. 2 illustrates the adjustable metering device. The needle 44 consists of three sections, the head 57, the needle body 55 and, the needle taper 56. The needle has the shape of a cylinder with one end tapered and the other end expanded, like the head of a nail. The expanded head of the needle restrains the needle from sliding thru the needle seat 52. The expanded head of the needle also provides means to react the forces that the needle spring 50 applies to the the needle. The tapered end of the needle fits into the needle jet 46. As the position of the needle 44 is moved in and out of the needle jet 46 the orifice available to the incoming fluid is altered. The rebound and compression needles are similar in both shape and function.

The amount of fluid flow restriction is determined by the position of the needle 44 relative to the needle jet 46.

As the needle 44 pushes against the needle spring 50 the tapered section of the needle 56, which restricts flow thru the needle jet 46 is progressively reduced. Thus the needle 44 provides means to alter the fluid restriction based on the fluid pressure applied to the needle 44.

The needle guide passage 47 is provided with a seal 49 to prevent the escape of fluid from the needle guide passage 47 to the spring tube 51. After the flow is metered by the needle 44 the fluid is free to pass thru the needle exit passage 48 to the reservoir fluid chamber 38.

The spring tube 51 screws into the needle seat 52 which in turn screws into the valving block 34. The needle spring 50 is fitted concentrically in the spring tube 51. The spring tube 51 extends beyond the the needle passage 43 and is concentric with the needle passage 43. The position of the needle is determined by the flow pressure drop and the force applied by the needle spring 50.

The spring rate, initial preload or the initial needle taper may all be adjusted without disassembling the entire shock absorber. A number of ways exist to adjust the spring. The spring could be exchanged for one of different length or stiffness. The favored embodiment, as discussed here has provisions in the spring tube to adjust the spring.

The spring tube 51 has holes 54 along its length so that a spring rate adjuster pin 53 can be inserted thru the spring 50 to alter the spring rate. One end of the spring 50 reacts against the head 57 of the needle 44 the other end of the spring 50 reacts against the spring rate adjuster pin 53.

OPERATION—FIGS. 2,3,4,5

There are two primary operation modes of the shock, the rebound stroke and the compression stroke. The damping characteristics of each stroke may be externally adjusted independently. The compression stroke compresses the shock. The rebound stroke extends the shock.

During the rebound stroke the piston rod lug 22 moves away from the upper cap lug 19. During the compression stroke the piston rod lug 22 moves towards the upper cap lug 19.

REBOUND STROKE

Figure 3:
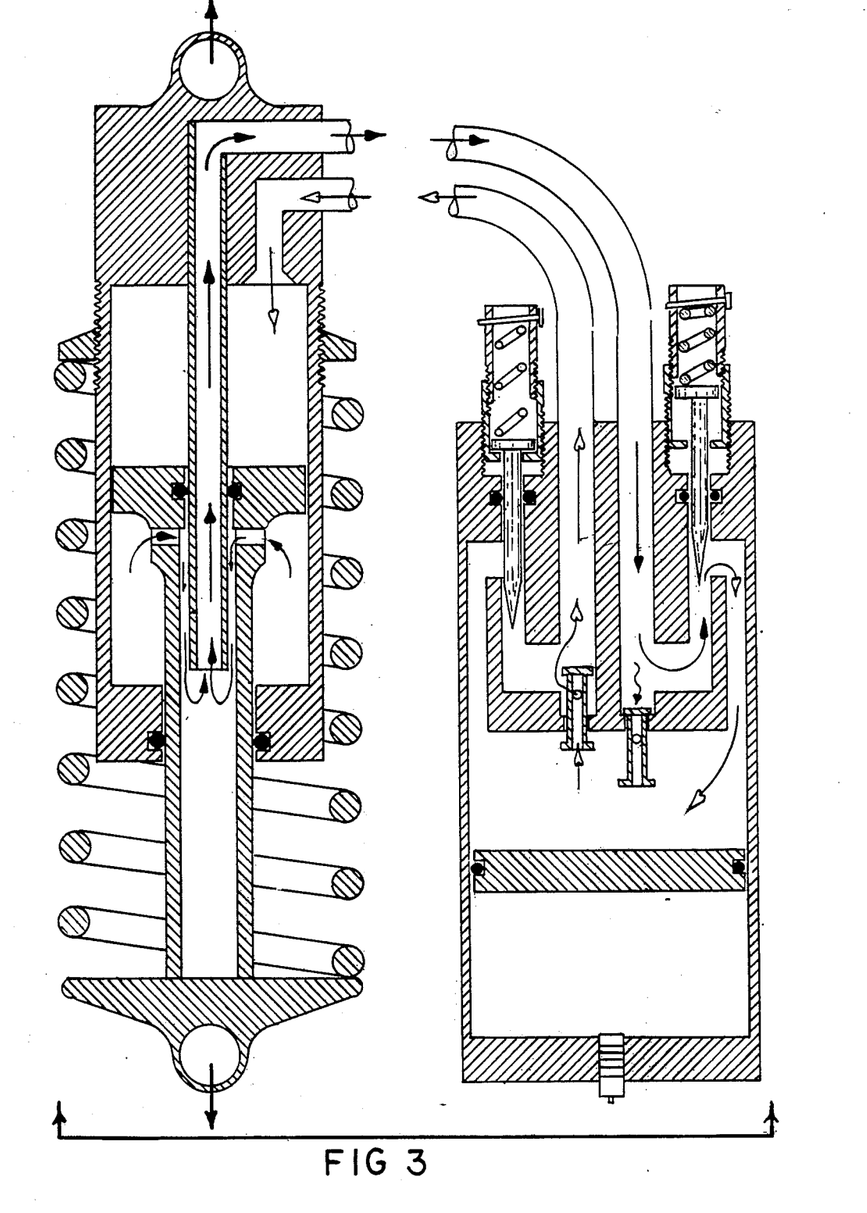
FIG. 3 is a longitudinal sectional view through the shock absorber and valving reservoir illustrating the fluid flow during the rebound stroke.

FIG. 3 is a diagram of the fluid flow during the rebound stroke. During the rebound stroke the piston 26 moves towards the bottom cap 20. As the piston 26 moves towards the bottom cap 20 the volume of the rebound chamber 27 is reduced and, the volume of the compression chamber 28 is increased.

The reduction of volume in the rebound chamber 27 causes the fluid in the rebound chamber 27 to flow thru the opening 29 in the piston rod and piston rod assembly 61. As the fluid flows thru the opening 29 the fluid enters the piston rod internal chamber 30. The fluid in the piston rod internal chamber 30 will flow thru the rebound tube opening 31 into the rebound tube 17. The fluid continues to flow thru the rebound tube 17 to the rebound exit passage 59, and out the external rebound line 13 to the valving block 34.

The fluid from the the external rebound line 13 enters the valving block at the rebound inlet passage 41R. The rebound check valve 45R prevents the flow of fluid from the rebound inlet passage 41R to the reservoir fluid chamber 38 but permits it the other way. Flow is directed from the rebound inlet passage 41R to the rebound needle jet 46R by the rebound transfer passage 42R.

The tapered end of the rebound needle 44R throttles the fluid flow thru the rebound needle jet 46R and out the rebound needle exit passage 48R. Fluid flows out the rebound needle exit passage 48R and into the reservoir fluid chamber 38 after being throttled b the rebound needle 44R.

The free floating reservoir piston 35 will displace upward to compensate for the increase of total volume in the combined rebound 27 and compression chambers 28 due to the displacement of fluid by the piston rod 16.

Fluid returns from the reservoir fluid chamber 38 to the expanding compression chamber 28 by entering the compression check valve 45C and flowing out thru the compression inlet passage 41C, thru the external compression line 14 to the compression exit passage 32, and returning to the expanding compression chamber 28.

COMPRESSION STROKE

Figure 4:
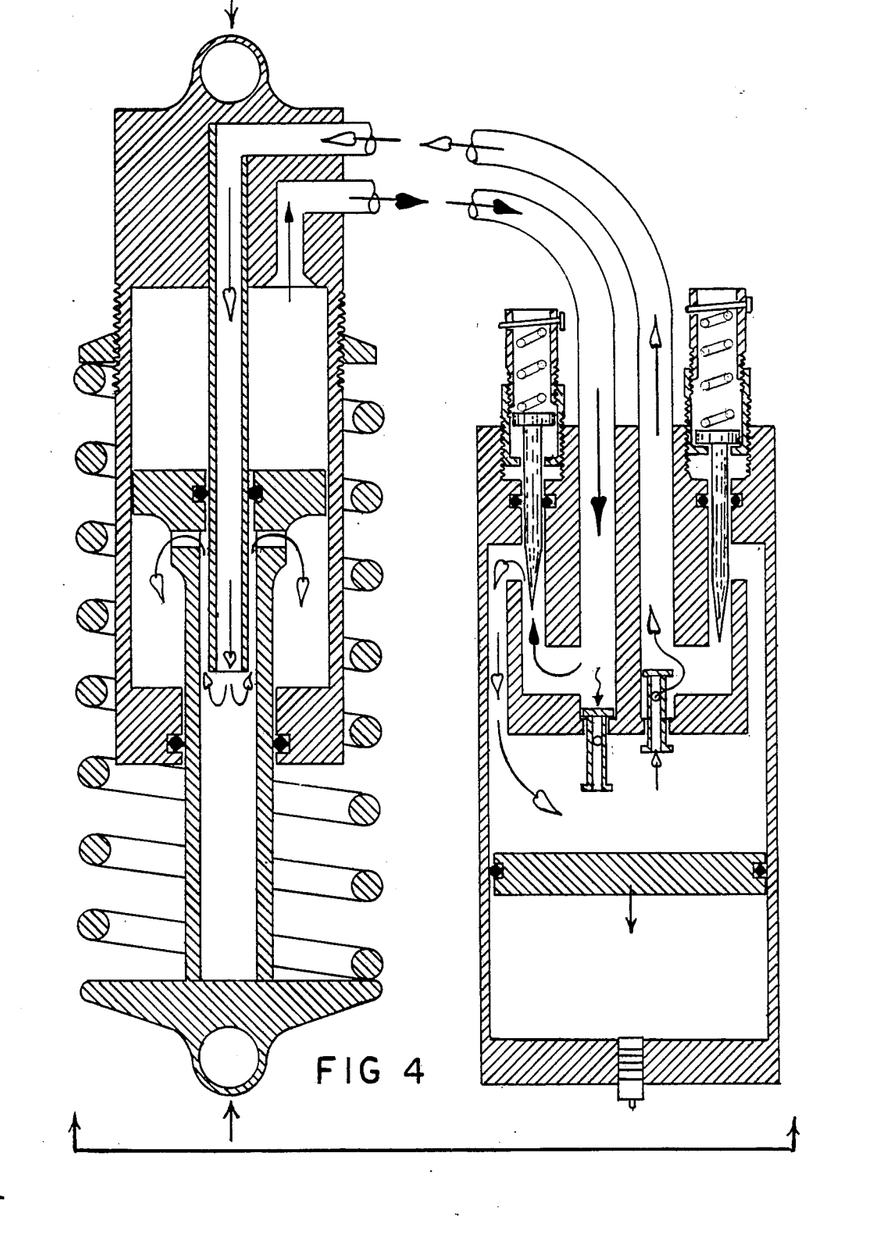
FIG. 4 is a longitudinal sectional view through the shock absorber and valving reservoir illustrating the fluid flow during the compression stroke.

FIG. 4 is a diagram of the fluid flow during the compression stroke. The compression stroke compresses the shock. During the compression stroke the piston rod lug 22 moves towards the upper cap lug 19 and, the piston 26 moves towards the upper cap 18. As the piston moves towards the upper cap 18 the volume of the compression chamber 28 is reduced and, the volume of the rebound chamber 27 is increased.

The reduction of volume in the compression chamber 28 causes the fluid in the compression chamber 28 to flow out of the compression chamber 28 and into the compression exit passage 32. From the compression exit passage 32 the fluid flows thru the external compression line 14 to the compression inlet passage 41C.

The fluid enters the valving block at the compression inlet passage 41C. The compression check valve 45C prevents the flow of fluid from the compression inlet passage 41C to the reservoir fluid chamber 38 but permits it the other way. Flow is directed from the compression inlet passage 41C to the compression needle jet 46C by the compression transfer passage 42C.

The tapered end of the compression needle 44C throttles the fluid flow thru the compression needle jet 46C and out the compression needle exit passage 48C. Fluid flows out the compression needle exit passage 48C into the reservoir fluid chamber 38.

The free floating reservoir piston 35 will be displaced downward to compensate for the loss of total volume in the combined rebound 27 and compression chambers 28 due to the displacement of fluid by the piston rod 16.

Fluid returns from the reservoir fluid chamber 38 to the rebound chamber 27 by entering the rebound check valve 45R and flowing out thru the rebound inlet passage 41R. Fluid flowing out thru the rebound inlet passage 41R exits the valving block 34 and flows thru the external rebound line 13 to the rebound exit passage 59.

The fluid flows out the rebound exit passage 59 to the rebound tube 17. The fluid exits to the rebound tube 17 at the rebound tube opening 31 and enters the piston rod internal chamber 30. The fluid leaves the piston rod internal chamber 30 via the piston rod opening 29 to enter the expanding rebound chamber 27.

FIG. 2 is an enlarged view of the fluid metering device. There are two such devices, one for metering the compression stroke and one for metering the rebound stroke. Each metering device is fully independent of the other. The operation of the metering device is pressure sensitive.

The characteristics of either of the external metering devices may be adjusted without the removal of fluid from the shock absorber. Flow is metered by the needle 44 in the needle jet 46. The throttling of the fluid takes place primarily at the needle. The heated fluid is then allowed to enter the reservoir fluid chamber 38 where it may be cooled efficiently.

As the needle raises out of the needle jet 46 the diameter of the needle 44 which restricts flow thru the needle jet 46 is progressively reduced. Thus the amount of fluid flow restriction is determined by the position of the needle 44. The position of the needle 44 relative to the exit passage 48 provides the system with a variable orifice.

The needle spring 50 controls the position of the needle 44. The position of the needle 44 is a function of the forces applied to the needle 44 by the spring 50 and the pressurized fluid.

The adjustment of the initial needle position, needle spring preload or needle spring rate thereby alters the damping characteristics of the shock. The damping characteristics of each stroke may be adjusted independently with the separate rebound and compression needles and springs.

The spring rate, initial preload or the initial needle position relative to the needle jet may all be adjusted without disassembling the entire shock absorber. This capability allows the user to taylor the characteristics of the shock to track conditions quickly and without disassembling the shock absorber.

A number of rays exist to adjust the spring. For example the spring could be exchanged for one of different length or stiffness. Another method would be to insert shims to preload the spring. The favored embodiment has provisions in the spring tube to adjust the spring.

The spring tube 51 has holes 54 along its length so that a spring rate adjuster pin 53 can be inserted perpendicular to the axis of the tube. The spring tube holes 54 pass thru the spring tube so that a pin can be inserted thru the spring 50 to alter the spring rate by altering the effective number of coils in the spring. One end of the spring 50 reacts against the head 57 of the needle the other end of the spring 50 reacts against the spring rate adjuster pin 53.

Figure 5:
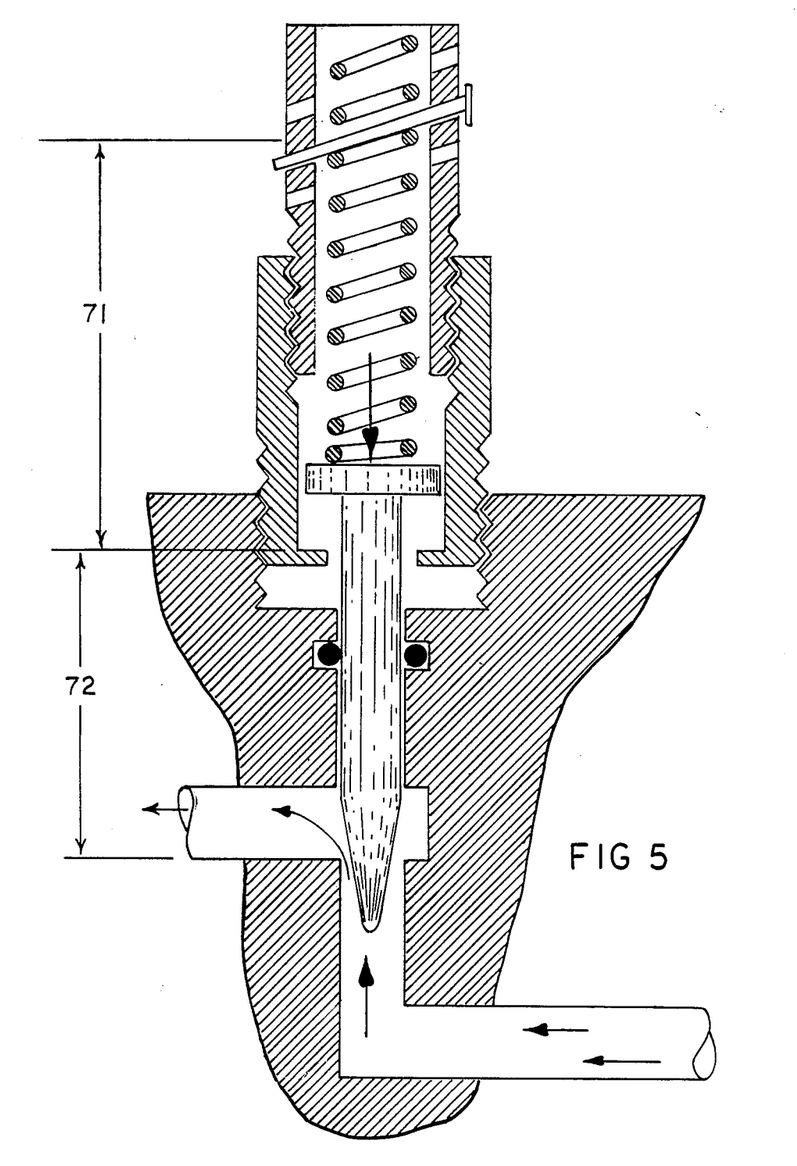
FIG. 5 is an enlarged longitudinal sectional view of the metering device illustrating the fluid flow and the adjustment capability.

FIG. 5 illustrates the favoured embodiment for adjusting the metering device. The effective length of the spring tube 51, is adjustable by means of the screw mechanism as shown by dimension 71 Thus a means of altering spring preload is provided by varying the length of the spring tube 51.

The height of the needle seat relative to the exit passage is adjustable so as to vary the initial position of the needle in the needle jet, dimension 72.

Thus the adjustments to the pressure relief mechanism are made easily and without disassembly of the shock absorber. Further the rebound and compression adjustments are independent. This ease of adjustment sets this invention apart from other adjustable shock absorbers.

SUMMARY, RAMIFICATIONS, AND SCOPE

Accordingly the reader will see that the rebound tube provides an efficient method for transmitting fluid from the rebound chamber to the external rebound line. Because of the novel use of the rebound tube both the compression and rebound lines may be attached to the upper cap of the shock body. Thus there is no possibility of the external lines being tangled by the coil spring.

The rebound tube also maintains a compact overall diameter of the shock body. This invention makes use of the space in piston rod which is often hollow in high performance shock absorbers. This space is used to transmit fluid from the rebound chamber to the external rebound lines via the rebound tube.

By taking the fluid to the metering device rather than taking the metering device to the fluid several significant advantages are realized. The option to provide remote mounting of the valving reservoir allows ready access to the metering devices for adjustment. All valving is contained in an external reservoir where adjustments may be performed quickly and easily. Since all metering is performed external to the shock the energy transfer takes place in the reservoir rather than the shock body, thus the hottest fluid is in the reservoir which can be mounted in a place where the cooling is optimum.

Furthermore the shock absorber has the additional advantages that
  it is of compact diameter;
  it is compatible with coil over type springs;
  it is a direct replacement for currently available motorcycle shock absorbers;
  it provides externally adjustable pressure sensitive valving;
  it provides independent rebound and compression adjustment;
  adjustments can be made quickly and easily;
  a wide range of damping adjustments are available;
  it provides improved cooling due to complete circulation of oil flow;
  it provides a hollow piston rod which allows optimal use of a tube in compression;
  due to a simple piston design it provides reduced unsprung weight;
  increased stroke is available in a more compact package due to the simpler piston taking up less space;
  lines attached directly to the shock absorber are clear and free of the coil spring.

Although the description above contains many specificities, these should not be construed as limiting the scope of the invention but as merely providing illustrations of some of the presently preferred embodiments of the invention. For example the needle could be controlled electronically rather than by the spring.

Thus the scope of the invention should be determined by the appended claims and their legal equivalents, rather than by the examples given.

I claim:

1. A hydraulic shock absorber which consists of three concentric hollow cylinders, an outer cylinder, a piston rod and, a rebound tube, the outer cylinder is attached in a fluid tight manner at one end to an upper cap which has provisions for attachment to the vehicle frame, and the other end of the outer cylinder is attached in a fluid tight manner to a bottom cap, the piston rod is formed from a hollow cylindrical tube of smaller diameter than the inside diameter of the outer cylinder and is fitted concentrically thru an opening in the bottom cap, said piston rod is free to slide within said bottom cap and a seal is provided to prevent the escape of fluid where the piston rod passes thru the bottom cap, the end of the piston rod which is external to the outer cylinder provides a mounting point for the vehicle suspension, the end of the piston rod which is internal to the outer cylinder is fitted with a piston, said piston is internal to and concentric with the outer cylinder, said piston divides the shock assembly into two main chambers, the rebound chamber and, the compression chamber, the piston and piston rod are fixed together as an assembly, the piston and piston rod assembly are free to slide within the outer cylinder, the rebound tube is a hollow cylindrical tube internal and concentric to the hollow piston and piston rod assembly, the rebound tube is connected at one end to the rebound exit passage located in the upper cap, the other end of said rebound tube is open to provide means for fluid to enter, a piston rod internal chamber is created by the inner cylindrical surface of said piston rod and the outer cylindrical surface of said rebound tube being of different diameters and being mutually concentric form a cylindrical space therebetween, an opening is provided in said piston and piston rod assembly to provide means so that fluid may pass from said rebound chamber to said piston rod internal chamber, the rebound tube to piston rod clearance is large enough to permit the flow of fluid between the outer diameter of the rebound tube and the inner diameter of the piston rod with negligible restriction, a rebound tube seal is formed from an annular sealing material placed in the piston and piston rod assembly to provide a means to prevent the flow of fluid between the compression chamber and the piston rod internal chamber while permitting the flow of fluid between the piston rod opening and the rebound tube opening, a rebound exit passage is open to an external rebound line, and thus the rebound chamber is connected directly to the external rebound line via the rebound tube.

2. The hydraulic shock absorber of claim 1, with the further provision that said compression chamber is connected directly to a compression exit passage which transmits fluid from said compression chamber to an external compression line.

3. The hydraulic shock absorber of claim 2, with the further provision that a valving reservoir assembly is provided which is external to said hydraulic shock absorber assembly and connected to said hydraulic shock absorber assembly by the external rebound and compression lines, said valving reservoir assembly consists of two separate circuits, one for the metering of compression flow and one for the metering of rebound flow, each circuit is comprised of a fluid throttling device which provides means for external adjustment of the strength of the damper, and a check valve which provides means for fluid to return to the shock absorber but prevents the fluid from bypassing the fluid throttling device.

4. The hydraulic shock absorber of claim 2, with the further provision that a valving reservoir assembly is provided which is external to said hydraulic shock absorber assembly and connected to said hydraulic shock absorber assembly by the external rebound and compression lines, said valving reservoir is comprised of a reservoir body, a valving block, a reservoir piston, and a reservoir end cap, said reservoir body is a hollow cylindrical tube which is sealed at one end by said reservoir end cap to prevent the escape of fluid, said reservoir piston is concentric with the reservoir body and divides the reservoir into two chambers, a reservoir fluid chamber which is filled with liquid and a reservoir gas chamber, which is filled with pressurized gas said reservoir end cap has a gas valve, said gas valve allows the introduction of a pressurized gas to said reservoir gas chamber, said valving block is mounted in a fluid tight manner concentrically within said reservoir body at the end of said reservoir body opposite to said reservoir end cap, Said valving block is comprised of a series of fluid passages including a rebound inlet passage, a rebound needle passage, a rebound needle exit passage, a compression inlet passage, a compression needle passage, and a compression needle exit passage, said external rebound line is attached to said valving block at said rebound inlet passage, said rebound inlet passage accommodates a rebound check valve which provides means to prevent the flow of fluid from said rebound inlet passage to said reservoir fluid chamber but permit it the other way, said rebound inlet passage is connected to a rebound needle passage, said rebound needle exit passage connects the rebound needle passage to said fluid chamber, the rebound inlet passage accommodates a rebound needle, said rebound needle provides means to throttle the flow of liquid thru said rebound needle passage as the fluid passes thru said rebound needle passage and out the rebound needle exit passage, said external compression line is attached to said valving block at said compression inlet passage, said compression inlet passage accommodates a compression check valve which provides means to prevent the flow of fluid from said compression inlet passage to said reservoir fluid chamber but permit it the other way, said compression inlet passage is connected to a compression needle passage, said compression needle exit passage connects the compression needle passage to said fluid chamber, the compression inlet passage accommodates a compression needle, said compression needle provides means to throttle the flow of liquid through said compression needle passage as the fluid passes, through said compression needle passage and out the compression needle exit passage, 5. The hydraulic shock absorber of claim 4, with the further provision that said rebound needle is controlled by a rebound needle spring, said rebound needle spring resides within a rebound spring tube, a rebound needle seat screws into the valving block concentric with said rebound needle passage to provide means to alter the position of said rebound needle, and said rebound spring tube screws into said rebound needle seat to provide means to alter the preload of said rebound needle spring, said rebound needle is concentric with and passes through the rebound needle seat, the rebound spring tube has holes along its length so that a rebound spring rate adjuster pin can be inserted through the rebound spring tube to provide means to alter the spring rate of said rebound needle spring, said compression needle is controlled by a compression needle spring, said compression needle spring resides within a compression spring tube, a compression needle seat screws into the valving block concentric with said compression needle passage to provide means to alter the position of said compression needle, and said compression spring tube screws into said compression needle seat to provide means to alter the preload of said compression needle spring, said compression needle is concentric with and passes thru the compression needle seat, the compression spring tube has holes along its length so that, a compression spring rate adjuster pin can be inserted through the compression spring tube to provide means to alter the spring rate of said compression needle spring.

6. A hydraulic shock absorber which consists of three concentric hollow cylinders, an outer cylinder, a piston rod and, a rebound tube, said piston rod is formed from a hollow cylindrical tube of smaller diameter than the inside diameter of the outer cylinder and is fitted concentrically within the outer cylinder, the end of the piston rod which is internal to the outer cylinder is fitted with a piston, said piston is internal to and concentric with the outer cylinder, said piston divides the shock assembly into two chambers, the rebound chamber and, the compression chamber, the piston and piston rod are fixed together as an assembly, the piston and piston rod assembly are free to slide within the outer cylinder, the rebound tube is a hollow cylindrical tube internal and concentric to the hollow piston and piston rod assembly, the rebound tube is connected at one end to an external rebound line and the other end of said rebound tube is open to provide means for fluid to enter said rebound tube, a piston rod internal chamber is created by the inner cylindrical surface of said piston rod and the outer cylindrical surface of said rebound tube being of different diameters and being mutually concentric form a cylindrical space therebetween, an opening is provided in said piston and piston rod assembly to provide means so that fluid may pass from said rebound chamber to said piston rod internal chamber, the rebound tube to piston rod clearance is large enough to permit the flow of fluid between the outer diameter of the rebound tube and the inner diameter of the piston rod with negligible restriction, a rebound tube seal is formed from an annular sealing material placed in the piston and piston rod assembly to provide a means to prevent the flow of fluid between the compression chamber and the piston rod internal chamber while permitting the flow of fluid between the piston rod opening and the rebound tube opening, and through the rebound tube to said external rebound line, and thus the rebound chamber is connected directly to said external rebound line via the rebound tube.

7. The hydraulic shock absorber of claim 6, with the further provision that said compression chamber is connected directly to a compression exit passage which transmits fluid from said compression chamber to an external compression line.

8. The hydraulic shock absorber of claim 7, with the further provision that a valving reservoir assembly is provided which is external to said hydraulic shock absorber assembly and connected to said hydraulic shock absorber assembly by the external rebound and compression lines, said valving reservoir assembly consists of two separate circuits, one for the metering of compression flow and one for the metering of rebound flow, each circuit is comprised of a fluid throttling device which provides means for external adjustment of the strength of the damper, and a check valve which provides means for fluid to return to the shock absorber but prevents the fluid from bypassing the fluid throttling device.

* * * * *